United States Patent
Lafet et al.

(10) Patent No.: US 10,353,096 B2
(45) Date of Patent: Jul. 16, 2019

(54) TIME-LAPSE SIMULTANEOUS INVERSION OF AMPLITUDES AND TIME SHIFTS CONSTRAINED BY PRE-COMPUTED INPUT MAPS

(71) Applicant: CGG SERVICES SA, Massy (FR)

(72) Inventors: Yves Lafet, Paris (FR); Laurene Michou, Paris (FR); Benjamin Roure, Calgary (CA); Raphael Bornard, Leiden (NL)

(73) Assignee: CGG SERVICES SAS, Massy (FR)

( * ) Notice: Subject to any disclaimer, the term of this patent is extended or adjusted under 35 U.S.C. 154(b) by 217 days.

(21) Appl. No.: 15/039,653

(22) PCT Filed: Dec. 11, 2014

(86) PCT No.: PCT/IB2014/003075
§ 371 (c)(1),
(2) Date: May 26, 2016

(87) PCT Pub. No.: WO2015/092542
PCT Pub. Date: Jun. 25, 2015

(65) Prior Publication Data
US 2017/0153344 A1     Jun. 1, 2017

Related U.S. Application Data

(60) Provisional application No. 61/916,576, filed on Dec. 16, 2013.

(51) Int. Cl.
*G01V 1/30* (2006.01)
*G01V 1/28* (2006.01)

(52) U.S. Cl.
CPC .............. *G01V 1/308* (2013.01); *G01V 1/282* (2013.01); *G01V 1/306* (2013.01);
(Continued)

(58) Field of Classification Search
None
See application file for complete search history.

(56) References Cited

U.S. PATENT DOCUMENTS 8,255,166 B2    8/2012  Tonellot et al.
2002/0013661 A1*  1/2002  Van Riel ............... G01V 1/306
                                                          702/2

(Continued)

FOREIGN PATENT DOCUMENTS

AU    2011224165 B2    9/2011
EP       1094338 A1    4/2001
EP       1865340 A1   12/2007

OTHER PUBLICATIONS

Labat et al., "4D Joint Stratigraphic Inversion of Prestack Seismic Data: Application to the CO2 Storage Reservoir (Utsira Sand Formation) at Sleipner Site" Oil & Gas Science and Technology 67(2):329-340, Mar. 2012.*
International Search Report in related International Application No. PCT/IB2014/003075, dated Jun. 18, 2015.
Written Opinion of the International Searching Authority in related International Application No. PCT/IB2014/003075, dated Jun. 18, 2015.

(Continued)

*Primary Examiner* — John C Kuan
(74) *Attorney, Agent, or Firm* — Patent Portfolio Builders PLLC

(57) ABSTRACT

Global inversion of multi-vintage seismic data uses simulated annealing to minimize a cost function simultaneously for all vintages and all angle stacks to yield values of geophysical properties. Each vintage is generated from an independent seismic survey of a subsurface structure conducted over a distinct period of time and includes seismic traces and angle stacks. An initial model of the subsurface structure is used and includes values for geophysical properties and time shift maps between vintages. The time shift map contains shifts in the seismic trace between vintages. The cost function includes a time shift map term for the difference between the time shift map and a calculated time shift of the seismic trace between vintages and is based on (Continued)

a proposed perturbation to at least one of the geophysical properties. The time shift map is also used as a global constraint on proposed perturbations of subsurface properties.

17 Claims, 10 Drawing Sheets

(52) U.S. Cl.
CPC .. *G01V 2210/612* (2013.01); *G01V 2210/614* (2013.01); *G01V 2210/6122* (2013.01); *G01V 2210/6161* (2013.01); *G01V 2210/622* (2013.01)

(56) References Cited

U.S. PATENT DOCUMENTS

2011/0075515 A1* 3/2011 Lie .......................... G01V 1/301
 367/50
2013/0289879 A1 10/2013 Grandi

OTHER PUBLICATIONS

J-P Coulon et al., "Stratigraphic Elastic Inversion for Seismic Lithology Discrimination in a Turbiditic Reservoir", SEG Technical Program Expanded Abstracts 2006, pp. 2092-2096.
Y. Lafet et al., "Global 4-D Seismic Inversion and Time-Lapse Fluid Classification", SEG International Exposition and Annual Meeting, 2009, Houston, Texas, pp. 3830-3834.
Y. Lafet et al., "Global 4-D Seismic Inversion and Time-Lapse Fluid Prediction", Eleventh International Congress of the Brazilian Geophysical Society, Aug. 24, 2009, pp. 1-4.
B. Roure et al., "Azimuthal Fourier Coefficient Elastic Inversion", CSPG/CSEG/CWLS GeoConvention 2012: Vision, May 14-18, 2012, pp. 1-9.
S. Smith et al., "Inversion of Multicomponent Seismic Time Shifts for Reservoir Pressure and Length: A Feasibility Study", May 12, 2015 (online), Geophysical Prospecting, Jan. 2016, vol. 64, Issue 1, pp. 83-101.
Office Action in European Application No. 14 851 439.1 dated Feb. 15, 2019. (All references not cited herewith have been previously made of record.).

* cited by examiner

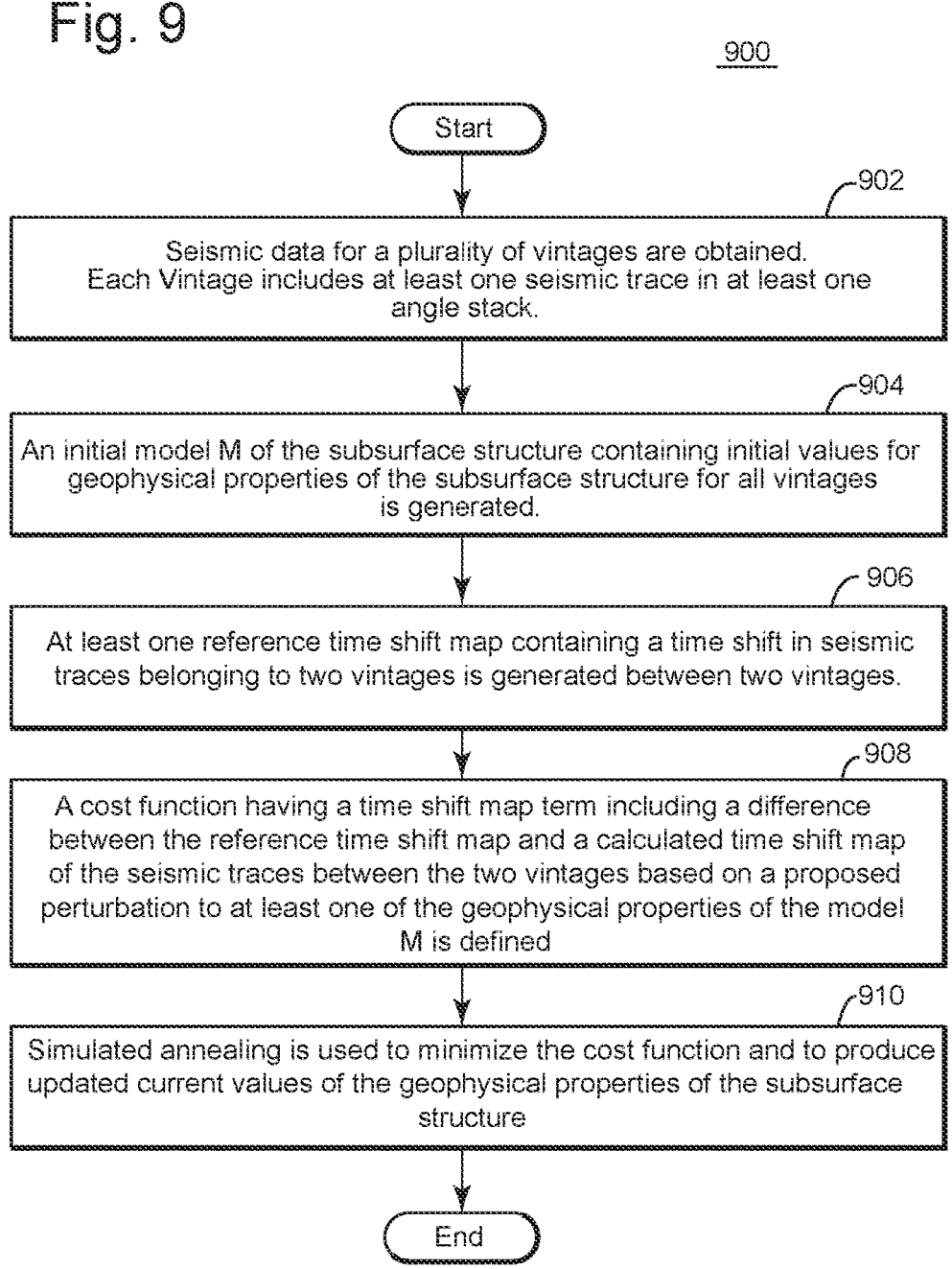

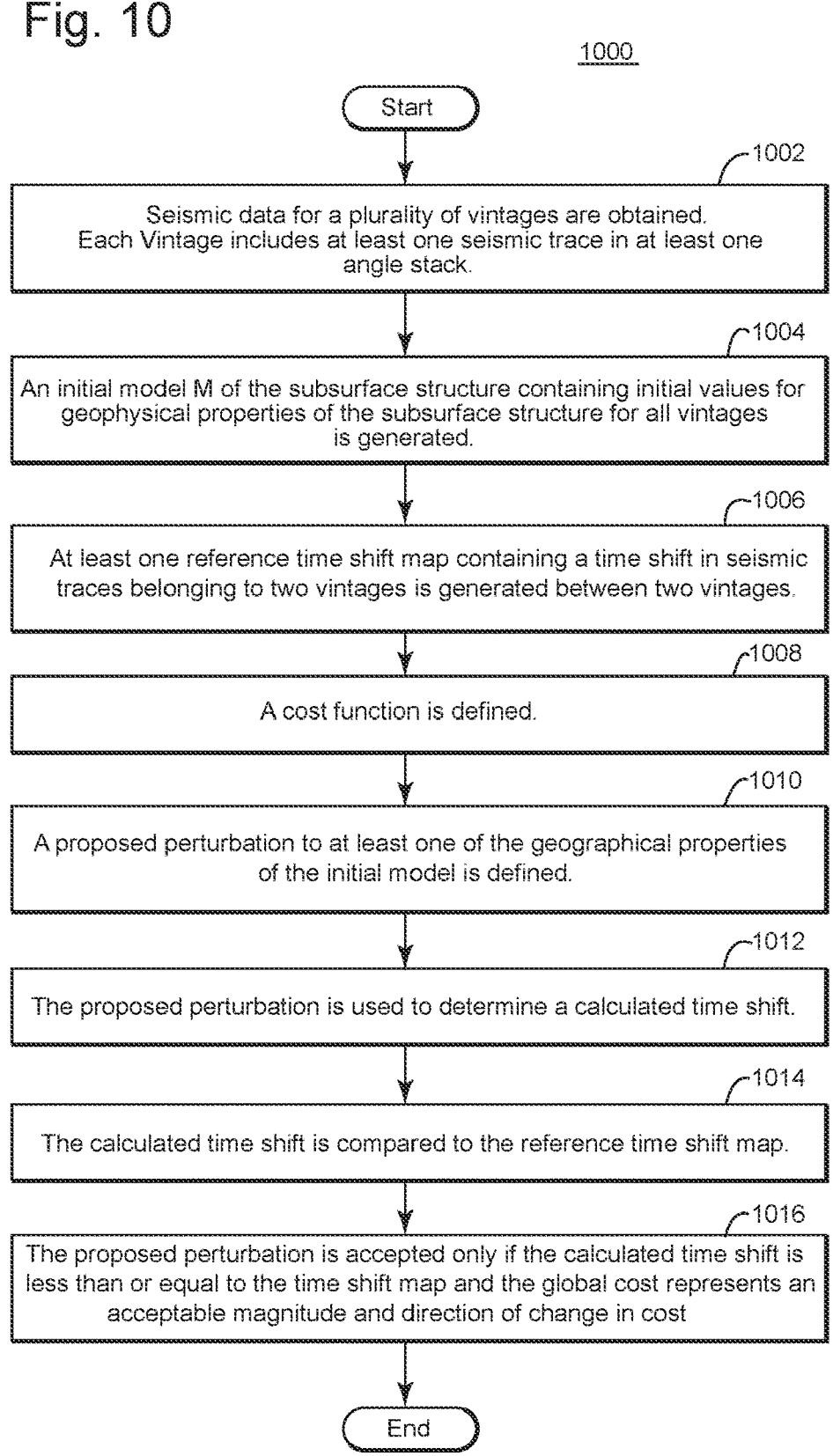

TIME-LAPSE SIMULTANEOUS INVERSION OF AMPLITUDES AND TIME SHIFTS CONSTRAINED BY PRE-COMPUTED INPUT MAPS

TECHNICAL FIELD

Embodiments of the subject matter disclosed herein generally relate to methods and systems for seismic data processing and, more particularly, to mechanisms and techniques for time lapse or 4D (4-dimension) seismic inversion.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves, the collection of reflected/refracted versions of those acoustic waves, and processing the collected seismic data to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

A configuration for achieving land seismic data is illustrated in FIG. 1. FIG. 1 shows a system 100 that includes multiple receivers 102 that are positioned over a monitored area 104 of a subsurface to be explored and that are in contact with, or below the surface 106 of, the ground. A number of dedicated seismic sources 108 are also placed on the surface 106 in an adjacent area 110 to the monitored area 104 containing the receivers 102. A dedicated seismic source is defined as a device built by man with the main purpose of generating seismic waves to be used for a seismic survey. As an alternative to being placed on the surface, dedicated seismic sources 108 are buried under surface 106. A central recording device 112 is connected to the plurality of receivers 102 and placed, for example, in a station or truck 114. Each dedicated seismic source 108 can be composed of a variable number of vibrators, typically between one and five, and can include a local controller 116. A central controller 118 can be provided to coordinate the shooting times of sources 108. A global positioning system (GPS) 120 can be used to time-correlate shooting of the dedicated seismic sources 108 and the recordings of the receivers 102.

With this configuration, dedicated seismic sources 108 are controlled to intentionally generate seismic waves, and the plurality of receivers 102 records waves reflected by oil and/or gas reservoirs and other structures and reflection points, e.g., the interface between subsurface formations having different acoustic impedances. The result of the seismic survey contains seismic data for geophysical parameters of subterranean rock formations. The seismic survey records both compressional, or P-waves and shear, or S-waves and is a combination of source wavelet and earth properties.

Analysis of the seismic data interprets earth properties and removes or minimizes the effects of the source wavelet. One type of analysis uses the three dimensional (3D) seismic data to obtain the geophysical properties of the subsurface layer such as P-wave velocity $V_p$, S-wave velocity $V_s$ and density $\rho$, which can be used to determine other properties of interest such as impedance, porosity, lithology, fluid saturation as well as other geomechanical properties. This analysis is known as 3D inversion. These properties are used to provide the location and structure of subsurface oil and gas reservoirs. Removal of the oil and gas from the reservoirs and introduction, for example, of water into the reservoirs to aid in the removal of the oil change the geomechanical properties of the reservoir and the location of the oil and gas within the reservoir. Therefore, seismic surveys are taken at different times in order to monitor these changes. Comparison of seismic surveys taken at different times, i.e., vintages, yields data on the changes in the properties of the subsurface layers. The changes in seismic data can be amplitude or time shift or both. For purposes of using inversion to obtain the changes in properties between vintages, time is viewed as a fourth dimension, and the process is 4D inversion.

The initial seismic survey is the base survey and any subsequent seismic survey is a monitor seismic survey. Independent inversion of base and monitor seismic surveys can yield estimates of elastic properties that are inconsistent with expected production effects. Approaches to conducting 4D seismic inversion include inverting base and monitor surveys separately and then differencing the results to calculate changes in elastic attributes, using inversion results for a base survey to define an initial model for inverting a monitor survey, inverting amplitude differences directly for changes in elastic parameters and inverting all vintages simultaneously. This last approach where all vintages are inverted simultaneously is referred to as global inversion. Global inversion of base and monitor is used to obtain quantitative estimates of impedance changes and to reduce the non-uniqueness of the inversion process. The need still exists, however, for improvements in the simultaneous inversion of all base and monitor seismic surveys in order to provide a better determination of the geophysical properties of the subsurface layer such as P-wave velocity $V_p$, S-wave velocity $V_s$ and density $\rho$.

SUMMARY

Exemplary embodiments are directed to systems and methods that provide an improved constraint on a 4D inversion of seismic data. In one embodiment, a term is used in a cost function of the inversion process to take into account an input calculated value. This input calculated value is a time shift map, $D_t$ map, between any two vintages of the seismic data. Use of the cost function term enables improved balance of P-velocity variations from density, $\rho$, variations to provide increased interpretation of the reservoir covered by the seismic data.

In one embodiment, the map of the time shift is used as a 4D hard constraint in order to determine whether a given perturbation on subsurface properties should be accepted or rejected. In one embodiment, the input value, i.e., the $D_t$ map, is calculated by cross correlation on the seismic data or is obtained from knowledge of the reservoir, for use of time shift as both a 4D hard constraint and as a term in the cost function.

In accordance with one embodiment, the present invention is directed to a method for global inversion of multi-vintage seismic data in which seismic data for a plurality of vintages are obtained, each including at least one seismic trace. In one embodiment, the seismic data between vintages are not aligned. An initial model M of the subsurface structure for all vintages is generated. The initial model contains initial values for geophysical properties of the subsurface structure. A cost function is defined that includes a difference between a reference time shift map and a calculated time shift map of the seismic traces between two vintages based on a proposed perturbation to at least one of the geophysical properties of the model M.

In one embodiment, the reference time shift map between the two vintages is a difference between a two way time at a second vintage and a two way time at a first vintage. In one embodiment, the reference time shift map is calculated for a layer in the subsurface structure located below a reservoir in the subsurface structure for which the updated current values of the subsurface are produced. In one embodiment, the reference time shift map between the two vintages is generated such that the reference time shift map contains a time shift in the seismic traces belonging to the two vintages, and the cost function is defined to include a time shift map term that includes the difference between the reference time shift map and the calculated time shift map of the seismic traces between the two vintages. In one embodiment, the reference time shift map is generated based on knowledge of a person running the global inversion, historical geophysical data of the subsurface structure, known rock physics of the subsurface structure, expected changes in the subsurface structure or combinations thereof.

In one embodiment, the time shift map term also includes a summation of the difference between the reference time shift map and the calculated time shift over all time shift maps and all vintages for all geophysical properties for which a perturbation is proposed. The time shift map term includes a unique user-defined weight associated with each term in the summation. In one embodiment, the proposed perturbation is used to determine a calculated time shift, and the calculated time shift is compared to the reference time shift map. The proposed perturbation is accepted only if the calculated time shift is less than or equal to the reference time shift map. In one embodiment, the proposed perturbation is used in a cost function to determine a global cost associated with making the proposed perturbation. The proposed perturbation is accepted if the global cost is of acceptable magnitude and direction.

In one embodiment, the initial model includes a stratigraphic grid framework defined in the time domain and containing a plurality of cells, a vertical thickness of each cell in the grid defined in the time domain and a horizontal width of each cell in the grid defined in a spatial domain. Each cell includes initial values for geophysical properties of the subsurface structure within that cell, and the proposed perturbation includes a proposed perturbation in at least one geophysical property in each cell. In one embodiment, a 4D mask is defined for the cells within the stratigraphic grid framework. The 4D mask identifies cells for which perturbations in the geophysical data within those cells are permitted between vintages. In one embodiment, corridors are defined for each geophysical property. Each corridor contains an allowed magnitude and direction of increase and decrease of a given single perturbation of a given geophysical property.

In one embodiment, the cost function includes a misfit term that calculates a difference between the obtained seismic data and modeled seismic data obtained by convolution of a reflectivity series and an angle dependent wavelet. The misfit term includes a summation of the difference for all angle stacks of all vintages. In addition, a lateral continuity term is included that contains a sum of second derivatives equivalent to a curvature and is computed for each vintage and for each geophysical property, and a prior model term is included that measures a distance between a prior model and a current model and controls how far a given solution is allowed to move away from an initial trend. The prior model is calculated for each vintage and each one of the geophysical properties. In one embodiment, a unique user defined weight is associated with each one of the time shift map term, the match misfit term, the lateral continuity term and the prior model term.

Having defined the cost function, simulated annealing is used to minimize the cost function and to produce updated current values of the geophysical properties of the subsurface structure. In one embodiment, using simulated annealing further includes defining the proposed perturbation in at least one geophysical property, using the cost function to calculate a global cost simultaneously for all vintages and all angle stacks and using the calculated global cost to determine whether to accept or to reject the proposed perturbation.

Exemplary embodiments in accordance with the present invention are also directed to a method for global inversion of multi-vintage seismic data that includes obtaining seismic data for a plurality of vintages, each including at least one seismic trace in at least one angle stack. An initial model M of the subsurface structure for all vintages is generated. The initial model contains initial values for geophysical properties of the subsurface structure. At least one reference time shift map is generated between two vintages. The reference time shift map contains a time shift in seismic traces belonging to the two vintages. A proposed perturbation to at least one of the geophysical properties of the initial model is identified and is used to determine a calculated time shift map. The calculated time shift map is compared to the reference time shift map, and the proposed perturbation is accepted only if the calculated time shift map is less than or equal to the reference time shift map.

In one embodiment, a cost function is defined and is used to determine a global cost based on the proposed perturbation. The proposed perturbation is accepted if the global cost represents an acceptable magnitude and direction of change in cost. In one embodiment, in order to define the cost function, a misfit term is defined that calculates a difference between the obtained seismic data and modeled seismic data obtained by convolution of a reflectivity series and an angle dependent wavelet. The misfit term includes a summation of the difference for all angle stacks of all vintages. A lateral continuity term is defined containing a sum of second derivatives equivalent to a curvature and is computed for each vintage and for each geophysical property, and a prior model term is defined that measures a distance between a prior model and a current model and controls how far a given solution is allowed to move away from an initial trend. The prior model is calculated for each vintage and each one of the geophysical properties.

Exemplary embodiments in accordance with the present invention are also directed to a computer-readable storage medium containing a computer-readable code that when read by a computer causes the computer to perform a method for global inversion of multi-vintage seismic data in which seismic data for a plurality of vintages are obtained, each including at least one seismic trace. An initial model M of the subsurface structure for all vintages is generated. The initial model contains initial values for geophysical properties of the subsurface structure. A cost function is defined that includes a difference between a reference time shift map and a calculated time shift map of the seismic traces between two vintages based on a proposed perturbation to at least one of the geophysical properties of the model M. Simulated annealing is used to minimize the cost function and to produce updated current values of the geophysical properties of the subsurface structure. In one embodiment, the reference time shift map is generated between the two vintages and contains a time shift in the seismic traces belonging to the two vintages. The cost function is defined to include a time shift map term that includes the difference between the reference time shift map and the calculated time shift map of the seismic traces between the two vintages.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 9 is a flowchart of another embodiment of a method for global 4D inversion of multi-vintage seismic data in accordance with the present invention; and FIG. 10 is a flowchart of yet another embodiment of a method for global 4D inversion of multi-vintage seismic data in accordance with the present invention.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
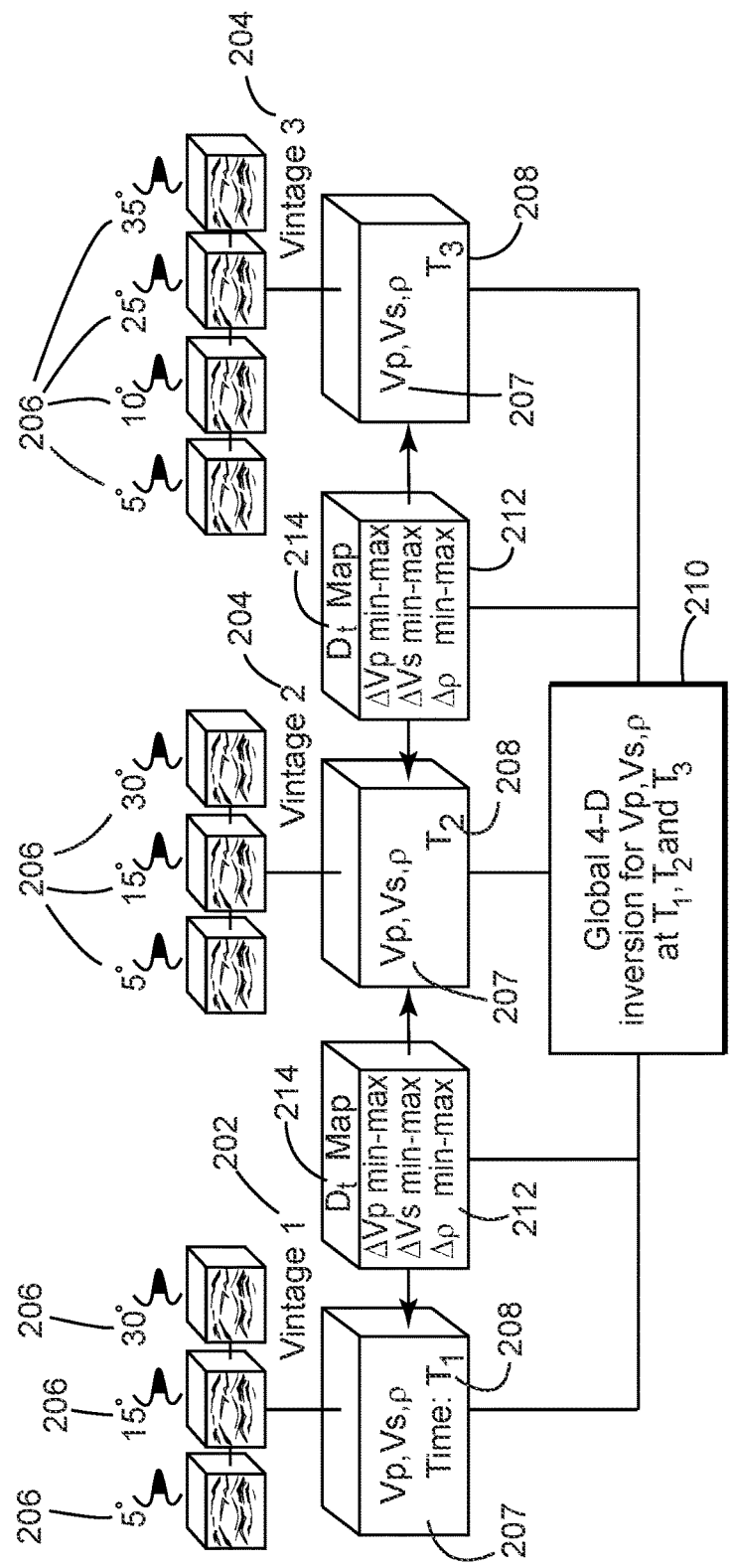
FIG. 2 illustrates multi-vintage seismic data from a surveyed area, constraints between the vintages and a global 4D inversion applied to the seismic data.

Exemplary embodiments of systems and methods obtain real seismic data for a given geophysical subsurface structure at a plurality of distinct survey times or vintages. The subsurface structure contains one or more reservoirs for which current geophysical data is desired or for which changes in the geophysical data (both in terms of amplitudes and time-shifts) resulting from reservoir productions is desired. Any suitable method for obtaining seismic data from a subsurface structure can be used. Suitable spacing between the vintages includes, but is not limited to, hours, days, weeks, months, years and combinations thereof. Referring to FIG. 2, the plurality of distinct survey times or vintages include a base or initial survey time vintage 202 and at least one subsequent or monitor survey time vintage 204. Although illustrated with three vintages, the seismic data can include two vintages or four or more vintages. In one embodiment, the distinct survey times include a base survey time and a plurality of subsequent monitor survey times. The obtained real seismic data in each vintage contains at least one and preferably a plurality of angle stacks 206 resulting from the geophysical properties 207 of the subsurface structure at the period of time 208 at which the seismic data are collected. Each angle stack is a stack of all traces for a given range of offsets between seismic sources and seismic receivers, which corresponds to an angle of incidence defined by a vertical line extending from a common mid point between all pairs of seismic sources and seismic receivers. A trace is a convolution between a reflectivity sequence and a wavelet. Therefore in one embodiment, each vintage has a plurality of angle stacks of seismic data traces associated with a plurality of angles of incidence.

Exemplary embodiments utilize a 4D global inversion 210 simultaneously for all vintages and all angle stacks in order to obtain the basic geophysical properties, $V_p$, $V_s$ and $\rho$, for the subsurface structure covered by the seismic data. From these properties, additional properties of the subsurface structure that are of interest in describing the current state of the subsurface structure, e.g., P-impedance $I_p$ and S-impedance $I_s$, or changes to the subsurface structure containing a reservoir are calculated. The number of vintages or the number of angle stacks per vintage that are utilized in the 4D inversion is not restricted.

In addition to the seismic data contained in the plurality of vintages, inputs into the global inversion include wavelets, initial models of the subsurface structure, 4D constraints 212 between vintages that are derived, for example, from the known rock physics of the subsurface structure and expected changes to the subsurface structure resulting from oil production from the reservoir in the subsurface structure, and a time-shift map 214 to account for differences for a given two way time, twt, between vintages as provided from the input model and the inversion estimation. The global inversion utilizes a simulated annealing (SA) algorithm in which a multi-term cost function is defined and is used to process proposed changes or perturbations in $V_p$, $V_s$, $\rho$ and twt in order to obtain a global optimal solution for the desired subsurface properties.

Figure 3:
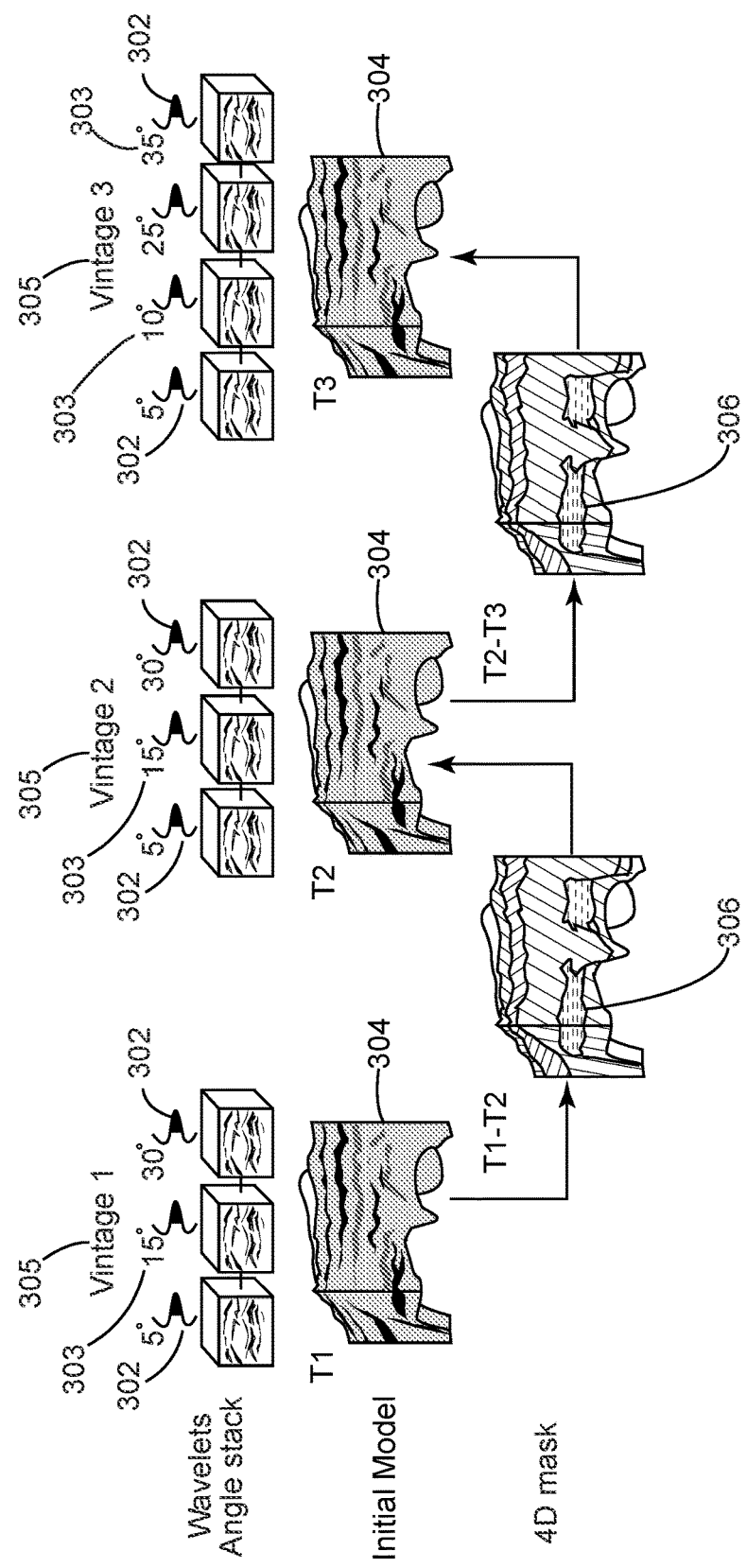
FIG. 3 illustrates angle stacks for each vintage, the angle-dependent and vintage-dependent wavelets, an initial model for each vintage and masks applied to the initial models.

In order to conduct the 4D global multi-vintage inversion, an independent wavelet is extracted for each vintage and each angle stack within each vintage. Referring to FIG. 3, in one embodiment, one wavelet 302 is associated with each angle stack 303 in each vintage 305. A time dependent initial layered model 304 is defined for $V_p$, $V_s$, $\rho$ and twt at each survey time, i.e., vintage. In one embodiment, a single time dependent initial model is generated that is common to all vintages. Preferably, information is used to produce different initial models so that each initial model is closer to the solution. For example, a low frequency variation is included in the initial model that the seismic does not allow to retrieve.

Figure 4:
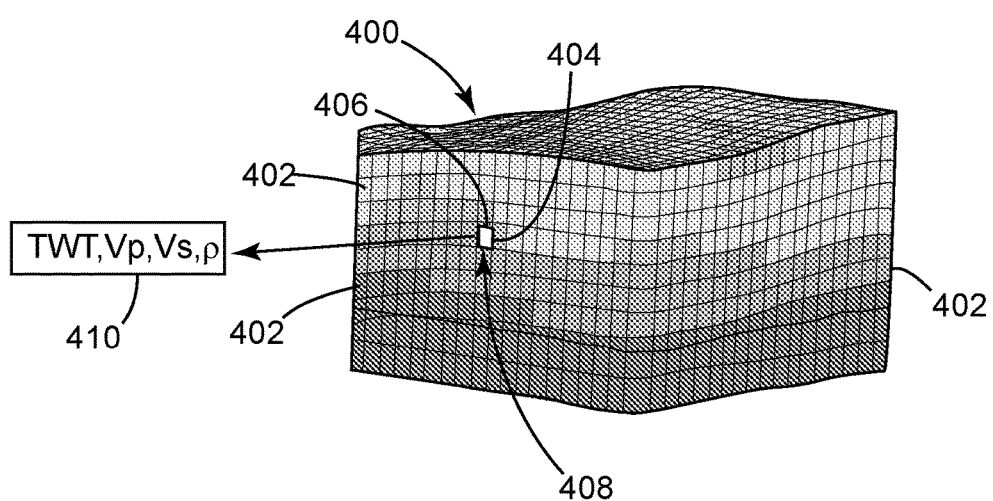
FIG. 4 illustrates a stratigraphic grid of the initial model containing a plurality of cells defined in the time domain.

Referring to FIG. 4, in one embodiment, the initial model is constructed using a stratigraphic grid framework 400 defined in the time domain and comprising a plurality of cells 402. Use of a stratigraphic grid defined with different time axis facilitates inclusion of the time-shifts between vintages as part of the inversion. The vertical thickness 404 of any given cell 408 in the grid is defined in the time domain. The horizontal width 406, i.e., the lateral dimensions, are spatially defined. In one embodiment, the lateral grid cell dimensions are fixed by the seismic trace spacing. Therefore, each cell in the grid is a separate container storing the attributes 410 of the initial model $V_p$, $V_s$, $\rho$ and twt in addition to any 4D constraints for that portion of the initial model. In one embodiment in the vertical direction, the grid cell thicknesses vary between about 2 msec to about 7 msec or from about 4 msec to about 6 msec. In general, the thickness depends on the wavelet bandwidth and frequency content of the seismic data. This time thickness can reflect changes in $V_p$ resulting from production of the reservoir. For example, the time thickness of each cell is modified based on cell velocities that change during reservoir production. These can be termed production-induced time-shifts and are an additional 4D constraint on cell time-thickness that can be represented by the following equation: $V_{p_{base}} \times \Delta twt_{base} = V_{p_{monitor}} \times \Delta twt_{monitor}$, where $\Delta$ represents the thickness of a layer or cell in time. According to this equation and assuming the depth is not changing, i.e., no compaction effect, the times and velocities are directly related. Accounting for production-induced time-shifts eliminates the need to warp the seismic data prior to inversion as well as the amplitude distortion associated with data warping. In addition, it also brings extra constraints on the P-velocity variation, assuming there is no depth change, to help stabilize the inversion. In general, FIG. 4 illustrates that the stratigraphic grid allows the time-shifts to be inverted and constrained because the grid can be defined in different time depending on the vintage.

The grid framework structure is the same for each vintage. The lateral dimensions do not change, and the vertical thickness is allowed to change to model the time shifts. Using the same grid framework structure for each vintage facilitates controlling the time evolution of the elastic properties $V_p$, $V_s$, $\rho$ and twt on a cell-by-cell basis during the global 4D multi-vintage inversion process.

In addition to independent wavelet extraction for each vintage and each angle stack, and creation of an initial model for each vintage, exemplary embodiments add constraints between one or more pairs of vintages including a base vintage and any monitor vintage as well as adjacent or subsequent vintages. Returning to FIG. 3, these constraints include a 4D mask 306 for cells within the initial model. This mask identifies the cells within the model for which variations in the geophysical data within those cells, i.e. perturbations, are permitted between vintages. This mask defines the portion or portions of the initial model where changes in the geophysical data are expected, for example, due to changes in the substructure caused by production from the reservoir and introduction of water into the reservoir. As production and water introduction occur in the reservoir, these masks correspond to the location of reservoirs in the subsurface structure. All cells are inverted. Inside the mask, the properties of the cells are allowed to change with vintages. Outside the mask, cell properties are still inverted, but the properties of these cells are the same for all vintages.

In one embodiment, the mask is determined by thresholding a filtered energy attribute, e.g., amplitude differences in seismic data between vintages, to identify cells associated with a relatively high energy difference, which indicates a change in subsurface structure and warrants inclusion in the mask, and relatively low energy differences, indicating no change and placement outside the mask. In one embodiment, cells from the initial layered model that are located outside the mask are assigned a zero-width 4D interval constraint. This forces the inverted properties to have the same values for the base vintage and all subsequent monitor vintages. Variations of the physical properties $V_p$, $V_s$, $\rho$ and twt are allowed for cells located within the mask.

Figure 5:
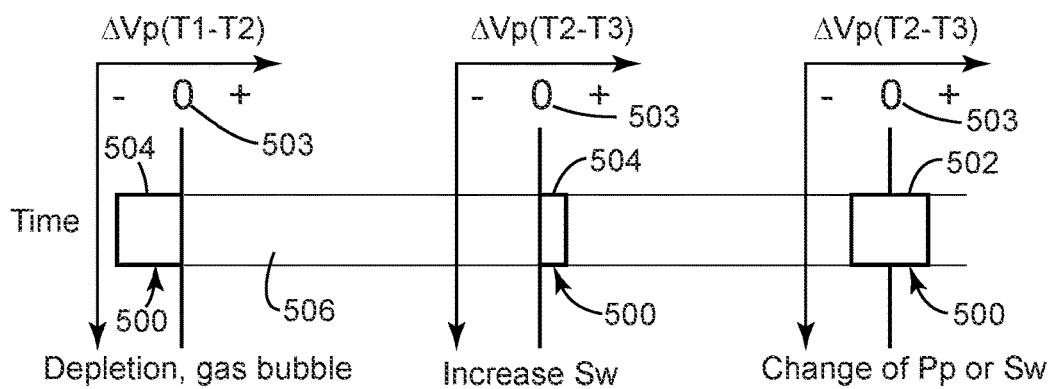
FIG. 5 illustrates examples of corridor constraints applied to changes in geophysical properties between vintages.

While changes in the cell properties are allowed within the mask, another 4D constraint limits the variation of any given property within a given cell. Referring to FIG. 5, these constraints are referred to as corridors 500 and represent an allowed magnitude and direction of increase or decrease, e.g., a positive or negative percentage increase, for any given perturbation of any given property from a reference value 503 over a given range of time 506 as cells are defined in the time domain. These permitted change corridors are based on known or anticipated changes in the geophysical properties of the subsurface structure. As illustrated, the change is for P-wave velocity between a given pair of vintages. These corridors can be symmetric 502, allowing an equal amount of positive and negative change, or asymmetric 504, only allowing a positive or negative change or allowing positive and negative changes of different magnitudes. In one embodiment, a time shift constraint, the time shift, $D_t$, map is added between any two vintages.

In one embodiment these corridors are based on the known or expected changes in the subsurface structure and the effects those changes will have on any one of the geophysical properties in each cell. For example, production from a given reservoir may result in the creation of air pockets, or oil in the reservoir can be displaced by water. In one embodiment, water injection is expected to increase $V_p$ and $\rho$ by a maximum of 5% and decrease $V_s$ by up to 2%. In this embodiment, pressure effects on the 4D response are expected to be very small and are not included in the definition of the 4D corridor constraints. Therefore, corridors are established that permit perturbations within this expected limits. In general, however, pressure effects can be included in the definition of the 4D corridor constraints.

In general, the use of corridors achieves time-lapse coupling between vintages, which controls the size of perturbations made between successive vintages. The corridors define, for each property, a specific min-max interval. This pre-defined range also controls the values that are explored by any given iteration of a simulated annealing algorithm. As described above, for example, water injection into a reservoir between two vintages produces an expected relatively large increase in $V_p$ and a relatively small decrease in $V_s$. This information is incorporated as a 4D interval constraint using a pre-defined corridor for $V_p$ and $V_s$.

In one embodiment, the corridors can be illustrated as 4D cubes containing both minimum and maximum values for each property as these corridors have both a time variance and a space variance. Selection of perturbation corridors also depends on other factors including a degree of confidence in the initial model, the reliability of the rock-physics information linking successive surveys and the magnitude of the 4D signal as well as other geological interpretation constraints. In one embodiment, these 4D constraints are hard constraints, and any perturbation that is not in the range of the user defined mask and corridor is rejected. In one embodiment, perturbations are drawn only in the corridors, which is more efficient. In this embodiment, perturbations are always drawn inside the corridors and then are accepted or rejected depending on the cost function.

The 4D global simultaneous inversion of the claimed invention utilizes the inputs and constraints and begins the inversion process from the time dependent initial model. As discussed above, a simulated annealing process is used in order to run the inversion process and to obtain the desired properties. Given the initial model, a perturbation of the properties in each one of the cells for each vintage, $V_p$, $V_s$, $\rho$ and twt, is iteratively defined using a simulated annealing procedure that optimizes simultaneously the misfit between the input angle stacks for all vintages, i.e., real data from the subsurface structure, and the corresponding synthetics, i.e., modeled data. A multi-vintage cost function that includes multiple terms is optimized. These terms include this misfit that calculates a level of residual energy for each angle stack and each vintage in each cell, a lateral continuity term that provides multi-trace lateral continuity constraints and controls the smoothness of the results, a prior model term that controls the distance the solution is allowed to move away from the initial model and a time-shift map term that constrains the time shift caused by any given perturbation of a given property, e.g., $V_p$, to be a minimized distance from a pre-defined time shift map. This multi-term cost function is minimized using the SA procedure that is adapted to the multi-vintage setting and allows user control on the level of 4D coupling between inverted elastic attributes. During the SA process, joint, independent or sequential perturbations of $V_p$, $V_s$, $\rho$ and twt values are introduced for the base and all monitor surveys, and are accepted or rejected as a whole. The cost function is used to determine whether a given proposed perturbation during a given iteration is accepted or rejected.

The first term of the cost function is the misfit term between the modeled data and the real data. In one embodiment, the misfit term is expressed as follows:

$$\Sigma_V \Sigma_\theta \alpha_1(\theta(V))(R(m(V),\theta(V))*W(\theta(V))-\text{Seismic}(\theta(V)))^2 \quad (1)$$

This misfit term accounts for all seismic angle stacks, $\theta$, of all vintages, V simultaneously. For each one of the angle stacks, the misfit is calculated by taking, for example, the L2 norm of the difference between the input seismic data, Seismic, and the modeled or synthetic data obtained by convolution, *, of a reflectivity series, R, and an angle dependent wavelet, W. The reflectivity series is calculated from the model M properties for each vintage, m=($V_p$, $V_s$, $\rho$, twt) using full anisotropic Zoeppritz reflectivity equations or a linear approximation such as the Aki-Richards equations depending on the maximum angle. The overall misfit is a weighted sum of all the individual misfits, where the weight given to each one, $\alpha_1$, is user dependent and will depend on factors such as, for example, the data quality. The misfit term can be calculated on aligned or non-aligned seismic traces.

A second possible term of the cost function is the lateral continuity term that measures and controls the lateral continuity of the estimated parameters. This gives smoothness and stability to the results especially in the presence of noise. The layer-based model combined with the multi-trace algorithm link together cells that are consistent with the stratigraphy. In one embodiment, the continuity term is expressed as follows:

$$\Sigma_V \Sigma_m \alpha_2(m(V)) \nabla^2 m(V) \quad (2)$$

As illustrated, the continuity term is defined mathematically as a Laplacian, i.e., sum of second derivatives, equivalent to the curvature. The continuity term of the cost function is computed for each vintage, V, and for each one of the model properties, m=($V_p$, $V_s$, $\rho$, twt). As with the misfit term, each continuity term can be weighted differently and is subject to a user-defined weight, $\alpha_2$. The continuity term is computed in three dimensions, two lateral dimensions and one vertical dimension.

A third possible term of the objective cost function is the prior model term that measures and controls the distance between the prior and current models and controls how far the solution is allowed to move away from the initial trend. In one embodiment, the prior model term is given as follows:

$$\Sigma_V \Sigma_m \alpha_3(m(V))|m(V)-m_0(V)| \quad (3)$$

The prior model term may be a L1 norm and is calculated for each one of the model properties, m=($V_p$, $V_s$, $\rho$, twt) for each vintage, V. Increasing this constraint prohibits the solution from moving away from the initial model. Decreasing this constraint allows the solution to move away from the initial model. As with the misfit term and lateral continuity terms, each prior model term can be weighted differently and is subject to a user-defined weight, $\alpha_3$.

Figure 6:
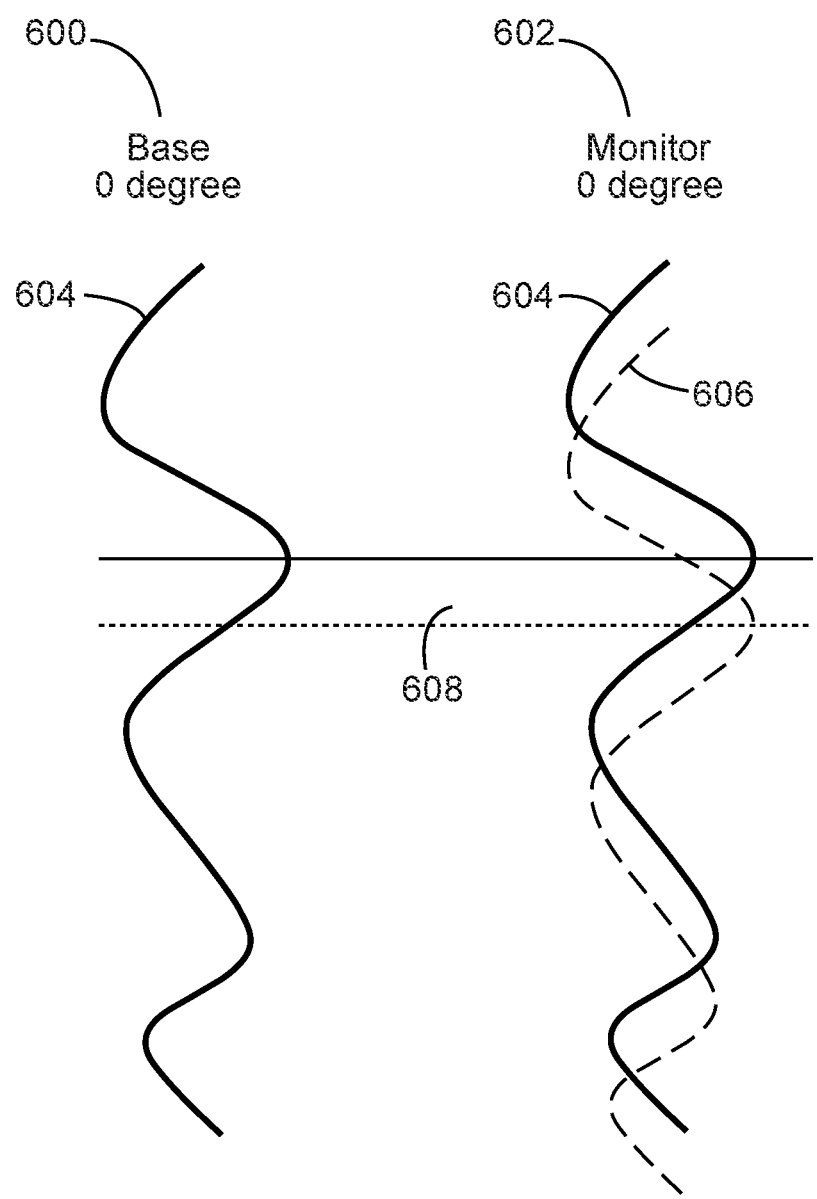
FIG. 6 illustrates a time shift between two seismic traces belonging to different vintages.

According to an embodiment, a fourth term in the cost function is the time shift map term. Note that in one application, the cost function can have only this term. In still another application, the cost function may have any combination of the four terms noted above. Referring to FIG. 6, a seismic trace 604 in a first or base 600 vintage can be shifted 606 in a second or monitor survey 602 by a certain time shift 608. In one embodiment, the time shift map term is an L1 misfit computed between an input time-shift map and the time-shift estimated from the inversion. Therefore, the time shift map term requires two inputs for the 4D inversion, a time shift map, $D_t$ map or $D_{t_{ref}}$, and a calculated time shift, $D_{t_{cal}}$, based on a given perturbation of one or more subsurface structure geophysical properties. $D_{t_{cal}}$ is a cumulated time-shift value from the top of the model to the zone of interest specified by the user and it may be simply the difference between the time axis of the stratigraphic grids of different vintages. In other words, the calculated time shift is calculated based on the model M with one or more of its parameters $V_p$, $V_s$, $\rho$, twt perturbated. One of the inputs is the $D_t$ map, which is a map of time shift between two vintages. Note that $D_t$ map assigns a time delay for each pair of traces, wherein any pair includes one trace from one vintage and a corresponding trace from the other vintage.

In one embodiment, this time constraint is introduced into the cost function by adding the following fourth term to the cost function, i.e., the time shift map term:

$$\Sigma_V \Sigma_\delta \alpha_4(\delta(V))|\Delta_{t_{ref}}(\delta(V))-\Delta_{t_{cal}}(\delta(V))| \quad (4)$$

The time shift map term may be an L1 misfit computed between an input time shift map and the time shift estimated from the inversion. This term is a sum over all of the input time shift maps, $\delta$, for all properties m=($V_p$, $V_s$, $\rho$, twt) at a given layer for all vintages, V. However, a time shift does not have to exist or be applied between each pair of vintages. For example, a single time shift map may be input between just a single pair of vintages in a plurality of vintages. The number of pairs of vintages between which an input time shift map is applied can be increased until a time shift map is applied between each pair of vintages. Several maps can be applied to the same pair of vintages at different layers position, e.g. in the case of reservoirs stacked on top of each other. Each time shift misfit can be assigned a given weight, $\alpha_4$.

As described above, the SA cost function has four terms, with the time shift map being incorporated into one of the four terms. Alternatively, the SA cost function term can have any single term or any combination of the four terms. Each term of the cost function is weighted using the "α" weights provided in those terms. By adjusting the weights within each cost function term, one or more of the terms can be eliminated from consideration with the cost function during the SA process or for a given iteration in the SA process. For example, the first three terms can be weighted down or deactivated in order to focus only on the effects of the time shift map constraint. Instead of being incorporated into the cost function, the time shift map can be also used as a 4D constraint or an upper bound. Following computation of the cost function based on a proposed perturbation, for example, without using the time shift map term, if $D_{t_{cal}}$ is higher than $D_{t_{ref}}$, then the proposed perturbation is rejected. Thus, in one application, both time shift map terms, the one in the cost function and the global constraint are used. In another application, the time shift map is not incorporated into the cost function, and the global cost function is solved using only the first three terms. Then the time shift map is used as the global 4D constraint.

Figure 7:
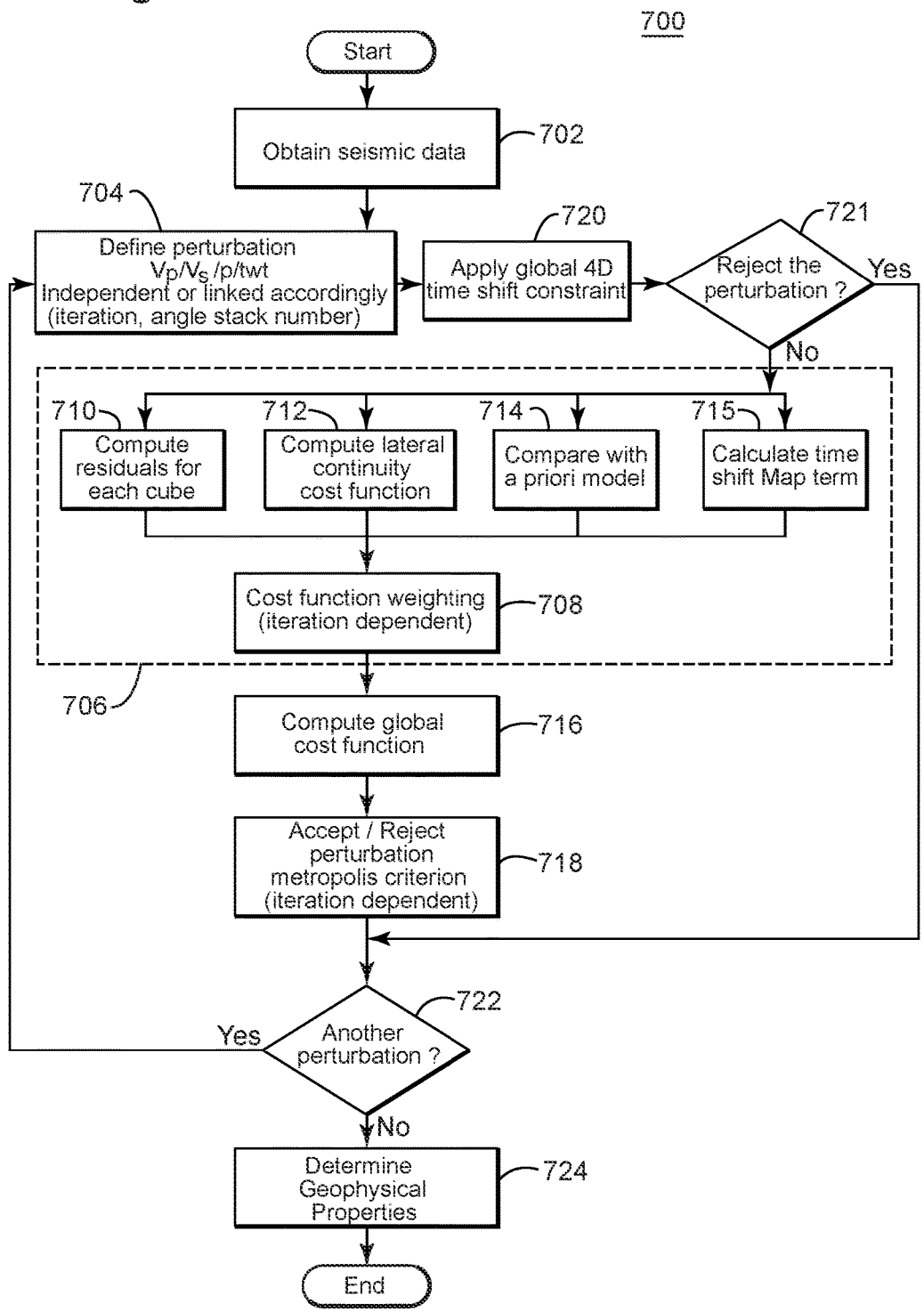
FIG. 7 is a flowchart of an embodiment of a method for global 4D inversion of multi-vintage seismic data in accordance with the present invention.

Referring to FIG. 7, an exemplary embodiment of a method for 4D global inversion 700 is illustrated. Having obtained all of the vintages and angle stacks of the seismic data 702, defined and inputted the initial model containing the plurality of cells defined in the time domain including the time shift maps between vintages, determined the mask on the initial model and corridors for perturbations on the cell properties, inputted 4D constraints and defined the cost function, the process of calculating a 4D inversion simultaneously over all vintages and all angle stacks starts by defining a change or perturbation 704 in the properties, $V_p$, $V_s$, ρ and twt, for each vintage in each cell of the initial model, i.e., the 3D stratigraphic grid. These perturbations are made within the defined corridors of each property. In one embodiment, each different property or elastic parameter is perturbed independently. Alternatively, the perturbations of two or more properties in a given cell are coupled using correlations among $V_p$, $V_s$, ρ and twt. In one embodiment, Gardner's relation is used to link $V_p$ and ρ when the number of angle stacks and data quality are not sufficient to independently estimate density variations.

The defined perturbations are proposed changes to the subsurface properties in each cell. In order to determine if these perturbations are to be accepted or rejected, they are used as inputs into the multi-term global cost function 706. A weight is determined and assigned to each term in each one of the four functions of the cost function. Each one of the four functions, the residual seismic term 710 described in equation 1, the lateral continuity term 712 described in equation 2, the prior model term 714 described in equation 3 and the time shift map term 715 described in equation 4, is determined. These terms are combined in accordance with their assigned weights 708, resulting in a global cost 716. Note that global cost 716 may not include term 715 if the time shift map is used as a constant as discussed later with regard to step 720. Alternatively, the global cost 716 may include term 715 while time shift map is applied as a constraint in step 720. The cost function is evaluated for magnitude and direction of change to determine if that proposed perturbation is accepted or rejected 718. In general, the metropolis criterion means that a perturbation that reduces the cost function is always accepted. A perturbation that increases or deteriorates the cost function are also accepted but with gradually decreasing probability.

In one embodiment, the 4D time shift constraint 720 may be applied by comparing a calculated time shift, $D_{t_{cal}}$, to the input time shift map $D_{t_{ref}}$. Based on this comparison, a determination is made regarding whether or not to reject the perturbation 721. If the calculated time shift, which is calculated based on a proposed perturbation for a given iteration of the model M, is greater than the input time shift map, that is if the time shift calculated from the proposed perturbation exceeds the time shift map constraint, then the proposed perturbation is rejected, and a determination is made regarding whether another perturbation is to be made 722 without calculating the cost function. If the calculated time shift is equal to or less than the input time shift map and the global function solution represents a cost change of acceptable magnitude and direction, the perturbation is accepted. If the resulting global cost function solution does not represent a cost change of acceptable magnitude and direction, then the proposed perturbation in cell properties is rejected. Having either accepted or rejected the current proposed perturbation in one or more cell properties, a subsequent perturbation is proposed, and the cost function calculations are repeated.

A determination is then made regarding whether another perturbation is to be made 722. If the process is to be continued, another set of perturbations is defined 704. This process continues iteratively until the cost function is minimized and the values of the subsurface properties are globally optimized for all cells in the subsurface structure. If another perturbation is not to be used, then the inversion process stops and the geophysical properties 724 are determined.

The resulting outputs of the inversion process are the geophysical parameters of the subsurface structure, e.g., $V_p$, $V_s$, ρ and twt, from which other parameters, e.g., impedances, can be determined. The resulting outputs provide an improved interpretation of the current properties of the subsurface reservoir of interest.

Referring to FIG. 9, an exemplary embodiment of a method for global inversion of multi-vintage seismic data 900 is illustrated. According to this method, seismic data for a plurality of vintages are obtained 902, wherein each vintage includes at least one seismic trace in at least one angle stack. The seismic data of different vintages do not need to be aligned since the inversion can take into account the time-shifts as part of the inversion. In one embodiment, the seismic data are not aligned between vintages as this is not required in order to invert for the time shifts using the stratigraphic grid. Alternatively, the seismic data between vintages are aligned. An initial model M of the subsurface structure containing initial values for geophysical properties of the subsurface structure for all vintages is generated 904. In one embodiment, at least one reference time shift map containing a time shift in seismic traces belonging to two vintages is generated between two vintages 906. A cost function having a time shift map term including a difference between the reference time shift map and a calculated time shift map of the seismic traces between the two vintages based on a proposed perturbation to at least one of the geophysical properties of the model M is defined 908, and simulated annealing is used 910 to minimize the cost function and to produce updated current values of the geophysical properties of the subsurface structure. Alternatively, the cost function does not include a time-shift map term.

Referring to FIG. 10, another exemplary embodiment of a method for global inversion of multi-vintage seismic data 1000 is illustrated, According to this method, seismic data for a plurality of vintages, each including at least one seismic trace in at least one angle stack, are obtained 1002. An initial model M of the subsurface structure containing initial values for geophysical properties of the subsurface structure for all vintages is generated 1004. At least one reference time shift map containing a time shift in seismic traces belonging to two vintages is generated between two vintages 1006. A cost function is defined 1008, and a proposed perturbation to at least one of the geophysical properties of the initial model is identified 1010. The proposed perturbation is used to determine a calculated time shift 1012, and the calculated time shift is compared to the reference time shift map 1014. Initially, the value of the time shift is checked before the cost function is calculated. If the time shift is not accepted, another perturbation is drawn. In one embodiment, the proposed perturbation is accepted only if the calculated time shift is less than or equal to the time shift map. Then a determination is made regarding whether the global cost represents an acceptable magnitude and direction of change in cost 1016.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for performing a global 4D seismic inversion and time-lapsed fluid classification of subsurface reservoirs in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

Figure 8:
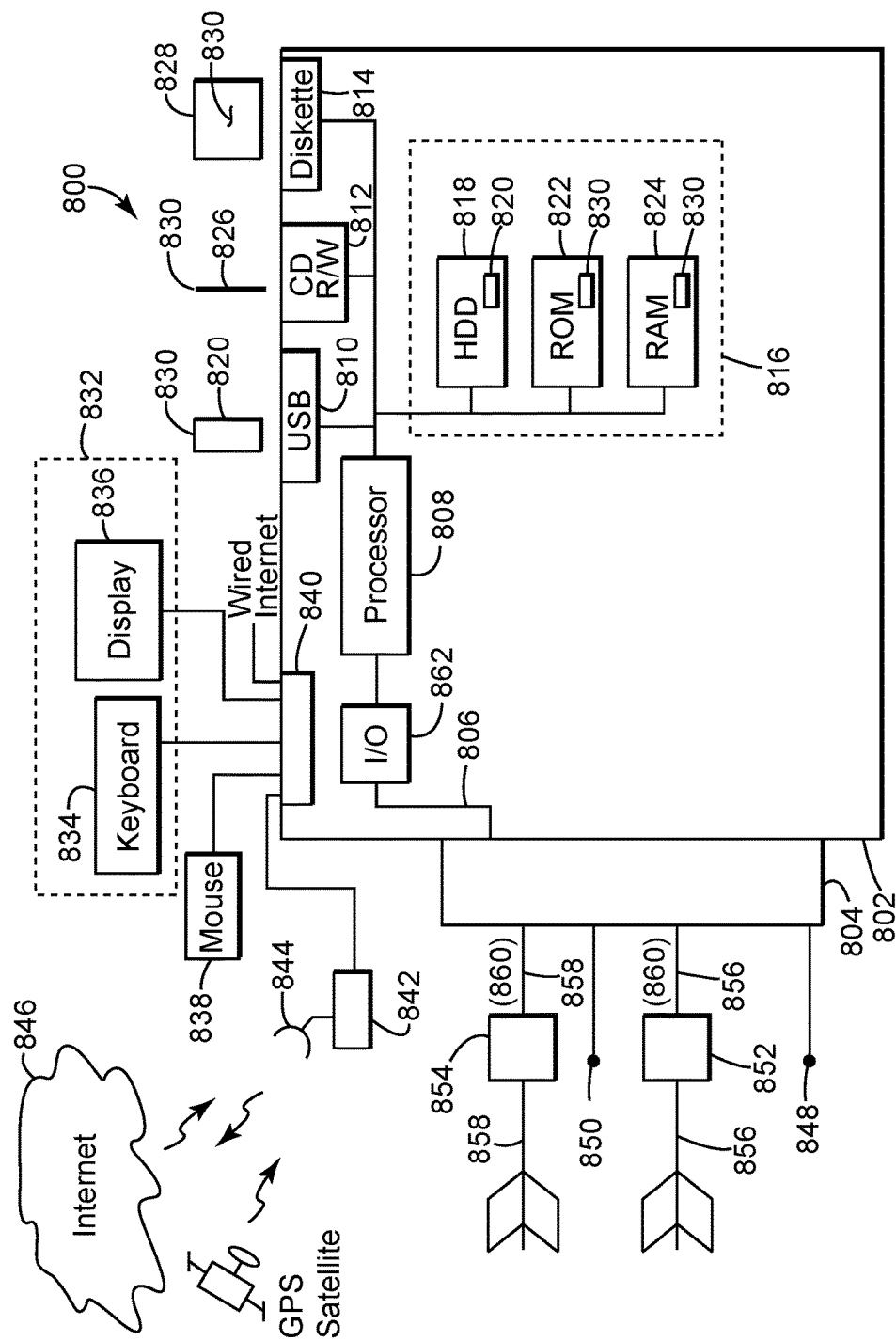
FIG. 8 illustrates an exemplary data processing device or system which can be used to implement the methods.

In one embodiment, a computing device for performing the calculations as set forth in the above-described embodiments may be any type of computing device capable of processing and communicating seismic data associated with a seismic survey. An example of a representative computing system capable of carrying out operations in accordance with these embodiments is illustrated in FIG. 8. System 800 includes, among other items, server 802, source/receiver interface 804, internal data/communications bus (bus) 806, processor(s) 808, universal serial bus (USB) port 810, compact disk (CD)/digital video disk (DVD) read/write (R/VV) drive 812, floppy diskette drive 814 (though less used currently, many servers still include this device), and data storage unit 816.

Data storage unit 816 itself can comprise hard disk drive (HDD) 818 (these can include conventional magnetic storage media, but, as is becoming increasingly more prevalent, can include flash drive-type mass storage devices 820, among other types), ROM device(s) 822 and random access memory (RAM) devices 824. Usable with USB port 810 is flash drive device 820, and usable with CD/DVD R/W device 812 are CD/DVD disks 826 (which can be both read and write-able). Usable with diskette drive device 814 are floppy diskettes 828. Each of the memory storage devices, or the memory storage media (818, 820, 822, 824, 826, and 828, among other types), can contain parts or components, or in its entirety, executable software programming code (software) 830 that can implement part or all of the portions of the method described herein. Further, processor 808 itself can contain one or different types of memory storage devices (most probably, but not in a limiting manner, RAM memory storage media 824) that can store all or some of the components of software 830.

In addition to the above-described components, system 800 also includes user console 832, which can include keyboard 834, display 836, and mouse 838. All of these components are known to those of ordinary skill in the art, and this description includes all known and future variants of these types of devices. Display 836 can be any type of known display or presentation screen, such as liquid crystal displays (LCDs), light emitting diode displays (LEDs), plasma displays, cathode ray tubes (CRTs), among others. User console 832 can include one or more user interface mechanisms such as a mouse, keyboard, microphone, touch pad, touch screen, voice-recognition system, among other interactive inter-communicative devices.

User console 832, and its components if separately provided, interface with server 802 via server input/output (I/O) interface 840, which can be an RS232, Ethernet, USB or other type of communications port, or can include all or some of these, and further includes any other type of communications means, presently known or further developed. System 800 can further include communications satellite/global positioning system (GPS) transceiver device 842, to which is electrically connected at least one antenna 844 (according to an embodiment, there would be at least one GPS receiver-only antenna, and at least one separate satellite bi-directional communications antenna). System 800 can access the Internet 846, either through a hard-wired connection, via I/O interface 840 directly, or wirelessly via antenna 844, and transceiver 842.

Figure 1:
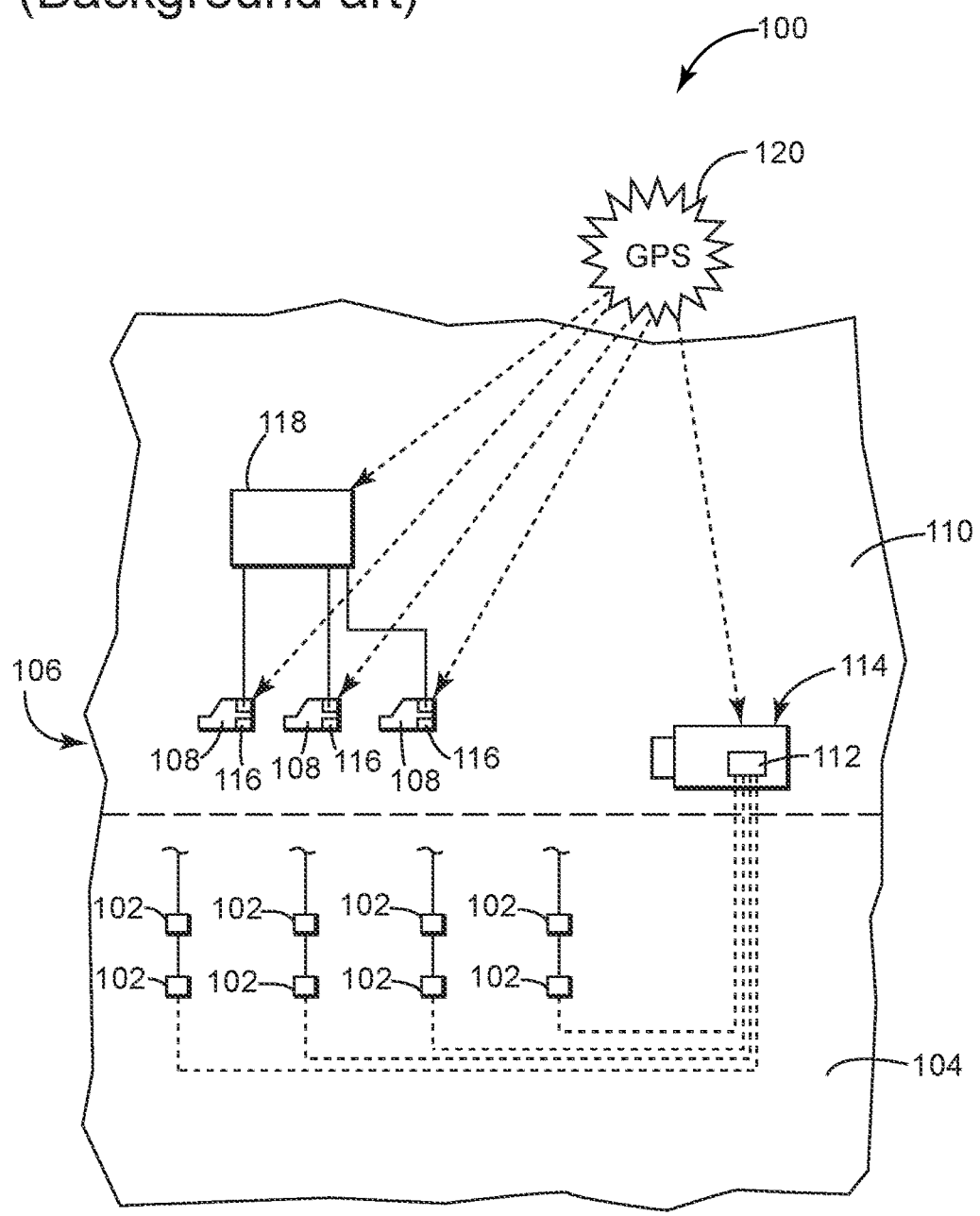
FIG. 1 illustrates a conventional land seismic data acquisition system.

Server 802 can be coupled to other computing devices, such as those that operate or control the equipment of truck 114 of FIG. 1, via one or more networks. Server 802 may be part of a larger network configuration as in a global area network (GAN) (e.g., Internet 846), which ultimately allows connection to various landlines.

According to a further embodiment, system 800, being designed for use in seismic exploration, will interface with one or more sources 848, 850 and one or more receivers 852, 854. As further previously discussed, sources 848, 850 and receivers 852, 854 can communicate with server 802 either through an electrical cable, or via a wireless system that can communicate via antenna 844 and transceiver 842 (collectively described as communications conduit 860).

According to further exemplary embodiments, user console 832 provides a means for personnel to enter commands and configuration into system 800 (e.g., via a keyboard, buttons, switches, touch screen and/or joy stick). Display device 836 can be used to show: source/receiver 856, 858 position; visual representations of acquired data; source 848, 850 and receiver 852, 854 status information; survey information; and other information important to the seismic data acquisition process. Source and receiver interface unit 804 can receive the seismic data from receiver 852, 854 though communication conduit 860 (discussed above). Source and receiver interface unit 804 can also communicate bi-directionally with sources 848, 850 through the communication conduit 860. Excitation signals, control signals, output signals and status information related to source 848, 850 can be exchanged by communication conduit 860 between system 800 and source 848, 850.

System 800 can be used to implement the methods described above associated with the calculation of the induced source shot gather. Hardware, firmware, software or a combination thereof may be used to perform the various steps and operations described herein. According to an exemplary embodiment, software 830 for carrying out the above-discussed steps can be stored and distributed on multimedia storage devices.

The disclosed exemplary embodiments provide a computing device, software and method for calculating the induced source shot gather. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geo-physics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic monitoring including a global inversion of multi-vintage seismic data, the method comprising:
   obtaining seismic data for vintages acquired over a subsurface structure at different times, each of the vintages including at least one seismic trace;
   generating an initial model M of the subsurface structure for all the vintages, the initial model containing initial values for geophysical properties of the subsurface structure;
   defining a cost function including a difference between a reference time shift map of seismic traces between two of the vintages and a calculated time shift map of the seismic traces between the two of the vintages, wherein the calculated time shift map is based on a proposed perturbation to at least one of the geophysical properties of the model M; and
   using simulated annealing to minimize the cost function and to produce updated current values of the geophysical properties of the subsurface structure,
   wherein changes in the geophysical properties between the vintages are used to monitor a gas and/or oil reservoir in the subsurface structure.

2. The method of claim 1, wherein:
   the method further comprises generating the reference time shift map between the two of the vintages, the reference time shift map containing a time shift between seismic traces belonging to the two of the vintages, respectively; and
   the defining of the cost function further comprises defining a time shift map term that includes a difference between the reference time shift map and the calculated time shift map of the seismic traces between the two of the vintages.

3. The method of claim 2 wherein the cost function further comprises:
   a misfit term that calculates a difference between the obtained seismic data and modeled seismic data obtained by convolution of a reflectivity series and an angle dependent wavelet, the misfit term including a summation of differences for all angle stacks of all the vintages;
   a lateral continuity term containing a sum of second derivatives equivalent to a curvature and computed for each of the vintages and for each of the geophysical properties; and
   a prior model term that measures a distance between a prior model and a current model and controls how far a given solution is allowed to move away from an initial trend, the prior model being calculated for each of the vintages and each one of the geophysical properties.

4. The method of claim 3, wherein a unique user defined weight is associated with each one of the time shift map term, the misfit term, the lateral continuity term and the prior model term.

5. The method of claim 3, wherein using simulated annealing further comprises:
   defining the proposed perturbation in at least one of the geophysical properties;
   using the cost function to calculate a global cost simultaneously for all the vintages and all the angle stacks; and
   using the calculated global cost to determine whether to accept or to reject the proposed perturbation.

6. The method of claim 1, wherein the reference time shift map between the two of the vintages comprises a difference between a two way time based on a second vintage among the two of the vintages and a two way time based on a first vintage among the two of the vintages.

7. The method of claim 1, wherein the reference time shift map is calculated for a layer in the subsurface structure located below a reservoir in the subsurface structure for which the updated current values of the subsurface are produced.

8. The method of claim 2, wherein the time shift map term further comprises a summation of differences between reference time shift maps and calculated time shift maps for pairs among all the vintages for all geophysical properties for which a perturbation is proposed.

9. The method of claim 8, wherein the time shift map term further comprises a unique user-defined weight associated with each term in the summation.

10. The method of claim 1, wherein the method further comprises:
using the proposed perturbation to determine a calculated time shift;
comparing the calculated time shift to the reference time shift map; and
accepting the proposed perturbation only if the calculated time shift is less than or equal to the reference time shift map.

11. The method of claim 10, wherein the method further comprises:
using the proposed perturbation in a cost function to determine a global cost associated with making the proposed perturbation; and
accepting the proposed perturbation if the global cost is of a predetermined acceptable magnitude and a predetermined acceptable direction.

12. The method of claim 1, wherein:
the initial model comprises a stratigraphic grid framework defined in the time domain and containing a plurality of cells, a vertical thickness of each cell in the grid defined in the time domain and a horizontal width of each cell in the grid defined in a spatial domain;
each cell in the grid includes initial values for geophysical properties of the subsurface structure within that cell; and
the proposed perturbation includes a proposed perturbation in at least one geophysical property in each cell in the grid.

13. The method of claim 12, wherein the method further comprises defining a 4D mask for the cells in the stratigraphic grid, the 4D mask identifying cells for which perturbations in the geophysical properties within those cells are permitted between vintages.

14. The method of claim 1, wherein the method further comprises:
defining corridors for each of the geophysical properties, each of the corridors containing an allowed magnitude and direction of increase and decrease of a given single perturbation of a given geophysical property.

15. The method of claim 1, wherein the reference time shift map is generated based on knowledge of a person running the global inversion, historical geophysical data of the subsurface structure, known rock physics of the subsurface structure, expected changes in the subsurface structure or combinations thereof.

16. The method of claim 1, wherein the seismic data between vintages are not aligned.

17. A non-transitory computer-readable storage medium containing an executable code that when executed by a computer causes the computer to perform a method for seismic monitoring including a global inversion of multi-vintage seismic data, the method comprising:
obtaining seismic data for vintages acquired over a subsurface structure at different times, each of the vintages including at least one seismic trace;
generating an initial model M of the subsurface structure for all the vintages, the initial model containing initial values for geophysical properties of the subsurface structure;
defining a cost function including a difference between a reference time shift map of seismic traces between two of the vintages and a calculated time shift map of the seismic traces between the two of the vintages, wherein the calculated time shift map is based on a proposed perturbation to at least one of the geophysical properties of the model M; and
using simulated annealing to minimize the cost function and to produce updated current values of the geophysical properties of the subsurface structure,
wherein changes in the geophysical properties between the vintages are used to monitor a gas and/or oil reservoir in the subsurface structure.

\* \* \* \* \*